US008698943B2

(12) United States Patent
Isogai et al.

(10) Patent No.: US 8,698,943 B2
(45) Date of Patent: Apr. 15, 2014

(54) IMAGING APPARATUS AND DISTANCE MEASUREMENT METHOD

(75) Inventors: Kuniaki Isogai, Osaka (JP); Takashi Kawamura, Kyoto (JP); Masayuki Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 96 days.

(21) Appl. No.: 13/522,057

(22) PCT Filed: Nov. 16, 2011

(86) PCT No.: PCT/JP2011/006373
§ 371 (c)(1),
(2), (4) Date: Jul. 13, 2012

(87) PCT Pub. No.: WO2012/066774
PCT Pub. Date: May 24, 2012

(65) Prior Publication Data
US 2012/0300114 A1  Nov. 29, 2012

(30) Foreign Application Priority Data
Nov. 17, 2010  (JP) ................................ 2010-257227

(51) Int. Cl.
*H04N 5/232* (2006.01)
*G06K 9/40* (2006.01)
(52) U.S. Cl.
USPC ......................................... 348/349; 382/255
(58) Field of Classification Search
CPC ................ G06T 7/0022; G06T 7/0051; G06T 2207/10028; H04N 13/0271
USPC ...................... 348/222.1, 252, 345, 348, 349, 348/354–356; 382/154, 255
See application file for complete search history.

(56) References Cited

U.S. PATENT DOCUMENTS

| 5,305,092 A | 4/1994 | Mimura et al. |
| 6,229,913 B1 | 5/2001 | Nayar et al. |

(Continued)

FOREIGN PATENT DOCUMENTS

| JP | 5-060528 | 3/1993 |
| JP | 10-508107 | 8/1998 |

(Continued)

OTHER PUBLICATIONS

International Search Report issued Dec. 27, 2011 in International (PCT) Application No. PCT/JP2011/006373.

(Continued)

*Primary Examiner* — Timothy J Henn
(74) *Attorney, Agent, or Firm* — Wenderoth, Lind & Ponack, LLP.

(57) ABSTRACT

An imaging apparatus includes: an imaging unit; a focal range control unit configured to cause the imaging unit to capture a first image and a second image which have mutually different focal ranges, changing a focal position of the imaging unit; a reference image generation unit configured to generate, using the first image and the second image, a reference image to be used as a blur standard; and a distance measurement unit configured to measure a distance to the subject based on a difference in blur degrees between the reference image and each of the first image and the second image. The focal ranges of the first image and the second image are independent of each other, and an out-of-focus space is provided between the focal ranges.

10 Claims, 9 Drawing Sheets

(56) References Cited

U.S. PATENT DOCUMENTS

| | | | |
|---|---|---|---|
| 6,320,979 B1* | 11/2001 | Melen | 382/154 |
| 7,680,411 B2* | 3/2010 | Ye | 396/334 |
| 8,199,248 B2* | 6/2012 | Li et al. | 348/353 |
| 2007/0019883 A1* | 1/2007 | Wong et al. | 382/276 |
| 2007/0036427 A1* | 2/2007 | Nakamura et al. | 382/154 |
| 2007/0189750 A1* | 8/2007 | Wong et al. | 396/121 |
| 2007/0297784 A1* | 12/2007 | Wong et al. | 396/89 |
| 2008/0175576 A1* | 7/2008 | Hong et al. | 396/89 |
| 2009/0109304 A1* | 4/2009 | Guan | 348/240.99 |
| 2009/0195666 A1* | 8/2009 | Chen et al. | 348/218.1 |
| 2009/0268985 A1* | 10/2009 | Wong et al. | 382/299 |
| 2010/0002950 A1 | 1/2010 | Arieli et al. | |
| 2010/0080482 A1* | 4/2010 | Wong et al. | 382/255 |
| 2010/0165152 A1* | 7/2010 | Lim | 348/240.99 |
| 2010/0189341 A1 | 7/2010 | Oota et al. | |
| 2011/0181770 A1* | 7/2011 | Rapaport et al. | 348/348 |
| 2012/0056984 A1* | 3/2012 | Zhang et al. | 348/43 |
| 2012/0148109 A1* | 6/2012 | Kawamura et al. | 382/106 |
| 2012/0154668 A1* | 6/2012 | Kimura et al. | 348/348 |
| 2013/0027587 A1* | 1/2013 | Matsui et al. | 348/241 |
| 2013/0169595 A1* | 7/2013 | Chang et al. | 345/175 |
| 2013/0222624 A1* | 8/2013 | Kane et al. | 348/208.4 |

FOREIGN PATENT DOCUMENTS

| | | |
|---|---|---|
| JP | 11-337313 | 12/1999 |
| JP | 2001-074422 | 3/2001 |
| JP | 2007-533977 | 11/2007 |
| JP | 2010-016743 | 1/2010 |
| JP | 2010-194296 | 9/2010 |
| WO | 96/41304 | 12/1996 |
| WO | 2005/086582 | 9/2005 |
| WO | WO 2011158508 A1 * | 12/2011 |

OTHER PUBLICATIONS

Hajime Nagahara et al., "Flexible Depth of Field Photography", European Conference on Computer Vision (ECCV), Oct. 2008.

* cited by examiner

| Space | Focal range 1 | Focal range 2 | RMS |
|---|---|---|---|
| -2 | 1st to 11th steps | 10th to 20th steps | 0.341 |
| -1 | 1st to 11th steps | 11th to 20th steps | 0.300 |
| 0 | 1st to 10th steps | 11th to 20th steps | 0.278 |
| 1 | 1st to 10th steps | 12th to 20th steps | 0.259 |
| 2 | 1st to 9th steps | 12th to 20th steps | 0.246 |
| 3 | 1st to 9th steps | 13th to 20th steps | 0.239 |
| 4 | 1st to 8th steps | 13th to 20th steps | 0.245 |
| 5 | 1st to 8th steps | 14th to 20th steps | 0.288 |

IMAGING APPARATUS AND DISTANCE MEASUREMENT METHOD

TECHNICAL FIELD

The present invention relates to imaging apparatuses and distance measurement methods, particularly to an imaging apparatus in use for measuring a distance to a subject using a plurality of captured images, and a distance measurement method performed using the apparatus.

BACKGROUND ART

Various techniques have been suggested for measuring, without contact, a depth of a three-dimensional scene, that is, a distance to each subject. Such techniques can be largely classified into an active technique and passive technique. In the active technique, the subject is irradiated with infrared rays, ultrasound, or laser, so as to calculate a distance based on a length of time until a reflected wave returns or an angle of the reflected wave. In the passive technique, the distance is calculated based on an image of the subject. Particularly, in the case of using a camera to measure the distance to the subject, the passive technique which does not require an apparatus for emitting infrared rays and so on is widely used.

Various passive techniques have been suggested, one of which is referred to as Depth from defocus (hereinafter, referring to as "DFD") which is a technique to measure the distance based on a blur generated by focus (focal position) change. The DFD has features such as not requiring a plurality of cameras, allowing distance measurement using a small number of images, and so on.

The DFD is a distance measurement technique using a blur of an image. However, there is a problem that it is extremely difficult to determine, from the captured image alone, whether the blur in the captured image was caused by change in lens focus or whether an original image which represents a state without lens-derived blur has a blurred texture from the beginning.

To deal with this, Patent Literature 1 discloses a distance measurement method independent from a spectral component of the original image, in which a ratio of a spatial frequency spectrum in each of a plurality of captured images is compared with a ratio of the spatial frequency spectrum of the blur corresponding to the depth of the scene.

On the other hand, Patent Literature 2 discloses a technique to obtain a reference image corresponding to the original image by capturing a large number of images by changing focus and extracting only focused portions of the images. The distance is measured by configuring a scale space in which various blurs are convolved into this reference image, and comparing the reference image and captured image on the scale space.

CITATION LIST

Patent Literature

[Patent Literature 1]
Japanese Patent Application Publication No. 11-337313
[Patent Literature 2]
US Patent Application Publication No. 2007/0019883, Specification

Non Patent Literature

[Non Patent Literature 1]
H. Nagahara, S. Kuthirummal, C. Zhou, S. K. Nayer, "Flexible Depth of Field Photography", European Conference on Computer Vision (ECCV), October, 2008

SUMMARY OF INVENTION

Technical Problem

However, to facilitate measurement, the technique in Patent Literature 1 is configured with a mask having a special structure inserted into an aperture, so that a zero point appears periodically in the spatial frequency spectrum of the blur. However, this has a problem of causing a decrease in amount of incident light. It is therefore, necessary to either increase sensitivity of the imaging device or increase an exposure-time period. However, the former causes an increase in noise of the captured image, and the latter causes a blur in the subject. These disturb spectral components of the subject to decrease accuracy in distance measurement.

On the other hand, in the technique disclosed in Patent Literature 2, a width of a depth of field is by far narrower than a distance measurement range unless the aperture is significantly stopped down, thus requiring a large number of images to be captured so as to obtain the reference picture. This offsets an advantage of the DFD which allows distance measurement using a small number of images. In addition, such significant stopping down of the aperture allows obtaining the reference image from a small number of images, but also decreases the amount of incident light, so that the technique in Patent Literature 2 has the same problem as the problem of the technique disclosed in Patent Literature 1.

An object of the present invention which is conceived in view of the problem above is to provide an imaging apparatus and distance measurement method which allow stable distance measurement from a small number of captured images.

Solution to Problem

In order to achieve the aforementioned object, an imaging apparatus according to an embodiment of the present invention includes: an imaging unit configured to image a subject to generate an image; a focal range control unit configured to cause the imaging unit to capture n images having mutually different focal ranges, changing a focal position of the imaging unit, where n is an integer greater than or equal to 2; a reference image generation unit configured to generate, using the n images, a reference image to be used as a blur standard; and a distance measurement unit configured to measure a distance to the subject based on a difference in blur degrees between the reference image and each of the n images, in which the focal ranges of the n images are independent of each other, and an out-of-focus space is provided between the focal ranges.

With this configuration, in the imaging apparatus according to an embodiment of the present invention, the image is captured with a focal position being changed, thereby obtaining an image which has the focal range broader than average images without stopping down an aperture. This enables the imaging apparatus according to the embodiment of the present invention to obtain the reference image from a small number of images. In addition, the focal ranges of the respective images are independent of each other. Accordingly, an image which has an approximately uniform blur can be generated with respect to the distance to the subject, using a plurality of images. Therefore, in the imaging apparatus according to the embodiment of the present invention, the reference image which has high accuracy can be obtained with a simple method. As mentioned above, in the imaging apparatus according to the embodiment of the present invention, a stable distance measurement can be achieved from a small number of captured images.

The imaging unit may include: an imaging device; and a lens which collects light into the imaging device, and the focal range control unit may be configured to change the focal position by changing a distance between the imaging device and the lens at a constant speed.

With this configuration, a depth of field is extended by a changed distance between the imaging device and the lens, thereby enabling the distance measurement in a broad range with a small number of images.

The n images may have a same exposure-time period.

With this configuration, noise included in the n images which have mutually different focal ranges can be made equally, thereby improving accuracy in distance calculation.

The focal range control unit may be configured to change the distance between the imaging device and the lens at the constant speed during a time period from initiation to completion of the imaging of the n images by the imaging unit.

With this configuration, control in changing the focal position can be easily performed.

The imaging unit may include: a lens; n imaging devices arranged to have mutually different optical path lengths from the lens; and a beam splitter which splits a light beam from the lens into light beams for the respective n imaging devices. The focal range control unit may be configured to cause the n imaging devices to simultaneously capture the respective n images, changing the focal positions of the n imaging devices simultaneously, during a same time period.

With this configuration, the n images having mutually different focal ranges can be simultaneously captured, thereby reducing a time period required for entire processing. Furthermore, each of the images has a depth of field which is continuously extended. Therefore, the distance measurement can be performed in a broad range with a small number of images.

The imaging unit may include: a lens; n imaging devices; and a selection unit configured to allow a light beam from the lens to selectively enter one of the n imaging devices. The focal range control unit may be configured to sequentially select the n imaging devices, and to cause the selection unit to allow the light beam to selectively enter the selected imaging device, thereby causing each of the n imaging devices to capture a corresponding one of the n images.

With this configuration, the n images having mutually different focal ranges can be simultaneously captured, thereby reducing the time period required for the entire processing. Furthermore, the images have the focal ranges which are discontinuous to one another, causing each of the images to have a blur shape based on which the distance measurement is easily performed by DFD algorithm.

The reference image generation unit may be configured to generate an average image of the n images, and to generate the reference image using the average image.

With this configuration, the focal ranges of the n images are independent of each other. Accordingly, the average image of the images has the uniform blur with respect to the distance to the subject. Therefore, the reference image having high accuracy can be obtained with the simple method.

The reference image generation unit may be configured to generate the reference image by performing, on the average image, a deconvolution operation by a single point spread function.

It should be noted that the present invention can be achieved not only as a distance measurement apparatus but also as a distance measurement method including, as steps, processing implemented by the distinguishable units included in the distance measurement apparatus. The present invention can also be achieved as a method for controlling the imaging apparatus, or as a program which causes a computer to execute such distinguishable steps. In addition, it is needless to say that such a program can be distributed via a non-transitory computer readable recording medium including a Compact Disc-Read Only Memory (CD-ROM) and so on or a transmission network such as the Internet.

Furthermore, the present invention can be also achieved as a semiconductor integrated circuit (LSI) which realizes a part of or all of function of the imaging apparatus.

Advantageous Effects of Invention

As described above, the present invention can provide an imaging apparatus and a distance measurement method which can achieve a stable distance measurement from a small number of captured images.

DESCRIPTION OF EMBODIMENTS

Hereinafter, embodiments of the present invention is described referring to drawings. It should be noted that the embodiments described below each represent preferred embodiments of the present invention. A numeral value, a shape, a material, a component, an arrangement position and connection condition of the components, a step, and a flow of steps, and the like described in the embodiments are merely examples, and are not intended to limit the present invention. The present invention is limited only by the scope of the claims. Accordingly, the component which is not defined in an independent claim representing the broadest concept of the present invention is described as not being necessarily required for achieving the object of the present invention but constituting a more preferred embodiment.

In an imaging apparatus according to the embodiments of the present invention, a plurality of images are captured each of which has an independent focal range. In addition, a space is provided between each of the plural focal ranges of the plural images. This allows the imaging apparatus to generate an image which has an approximately uniform blur with respect to a subject distance, using these plural images. As mentioned above, in the imaging apparatus according to the embodiments of the present invention, stable distance measurement can be achieved from a small number of captured images.

Figure 1:
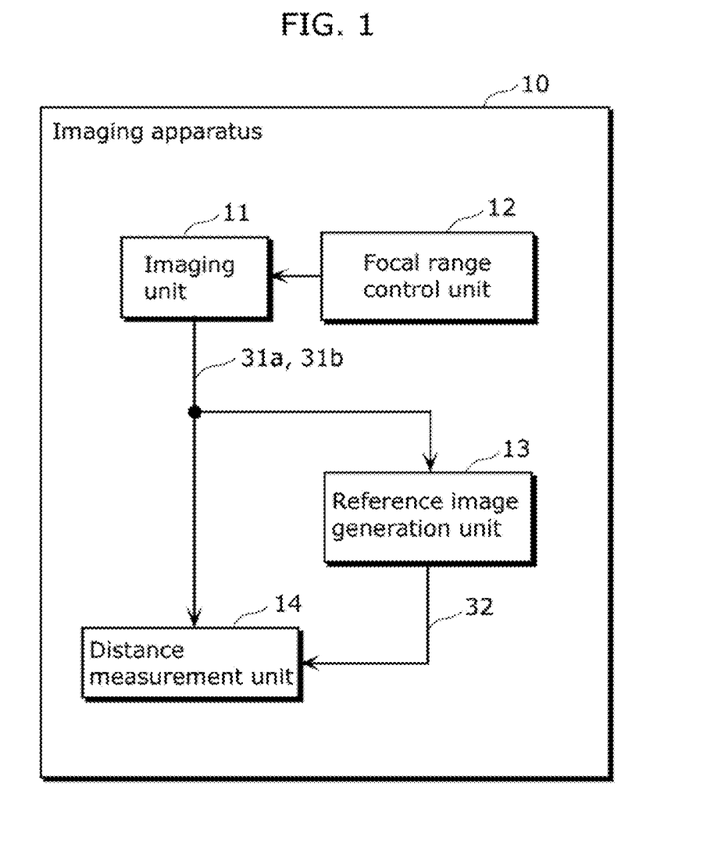
FIG. 1 is a diagram which shows a configuration of an imaging apparatus according to an embodiment of the present invention.

FIG. 1 is a diagram which shows a configuration of an imaging apparatus 10 according to the embodiment of the present invention. The imaging apparatus 10 shown in FIG. 1 captures an image and measures a distance between the imaging apparatus 10 and a subject captured in the image. The imaging apparatus 10 includes an imaging unit 11, a focal range control unit 12, a reference image generation unit 13, and a distance measurement unit 14.

The imaging unit 11 includes a lens unit in which a lens 21 collecting light is incorporated, and an imaging device 22 such as a charge coupled device (CCD) sensor or a complementary metal oxide semiconductor (CMOS) sensor. The imaging unit 11 has a function to generate an image by capturing an image of a subject.

The focal range control unit 12 has a function to control the lens unit of the imaging unit 11, so that a focal position and a depth of field are controlled. Specifically, the focal range control unit 12 causes a focal position to be changed by changing a distance between the lens 21 and the imaging device 22. More specifically, the focal range control unit 12 changes the distance between the lens 21 and the imaging device 22 by moving one of the lens 21 and the imaging device 22 or both lens 21 and the imaging device 22. For example, the focal range control unit 12 causes autofocus mechanism incorporated in the lens unit to operate at a specific pattern or switches particular optical elements with one another. It should be noted that the lens unit may include a plurality of lenses. In this case, the focal range control unit 12 may move one or more lenses among the plural lenses. The distance between the lens and the imaging device corresponds to a distance from a principle point of the lens to be moved or the plural lenses, to the imaging device, for example.

Furthermore, the focal range control unit 12 causes the imaging unit 11 to capture a plurality of images (a first image 31a and a second image 31b) having mutually different focal ranges and depths of field, causing a focal position of the imaging unit 11 to be changed. Here, each of the focal ranges of the plural images is independent of each other, and an out-of-focus space is defined between each of the focal ranges.

Although an example in which two images are used that have different focal ranges and depths of field is described in the following, three or more images may be used in the example.

The reference image generation unit 13 generates a reference image 32 to be used as a blur standard, using the first image 31a and the second image 31b which are generated by operation of the focal range control unit 12 to have mutually different focal positions and depths of field. Specifically, the reference image 32 is an image which estimates a state without blurs by the lens 21.

The distance measurement unit 14 performs distance measurement based on the DFD technique, using the first image 31a, the second image 31b, and the reference image 32. Specifically, the distance measurement unit 14 measures a distance to the subject from a difference in blur degrees of images between the reference image 32 and each of the first image 31a and the second image 31b.

Next, technique of extending the depth of field of the captured image is described. Generally, a width of depth of field is defined as follows. First, hyperfocal distance is described. The hyperfocal distance is a distance at which, when the lens is focused at the distance, an area beyond the distance (on a farther side from the lens) up to an infinite distance is judged to be in focus. The hyperfocal distance h can be approximated using Expression 1 below when f is a focal distance of the lens, F is an F-number of the lens, and c is a size of a permissible circle of confusion which indicates a smallest detectable blur.

[Math. 1]

$$h = \frac{f^2}{Fc} \qquad \text{Expression 1}$$

Expression 2 and Expression 3 below represent the depth of field at the time of focusing at the distance s, when DN is the depth of field in a front side of the distance s and Df is the depth of field in a rear side of the distance s.

[Math. 2]

$$D_n = \frac{(s-f)^2}{h+s-2f} \qquad \text{Expression 2}$$

$$D_f = \frac{(s-f)^2}{h-s} \qquad \text{Expression 3}$$

According to the expression above, in the case of fixed focal distance, the width of the depth of field can be changed only by stopping down an aperture.

In contrast, various techniques have been suggested to extend the width of the depth of field without stopping down the aperture. These are referred to as extended depth of field (hereinafter, "EDOF"). Specific EDOF techniques are described below.

A simplest EDOF technique is to capture a plurality of images by shifting the focal position little by little, and extracting the synthesizing focused portions from these images. The technique is also used in Patent Literature 2.

Whereas, Non-Patent Literature 1 discloses a technique of changing focus during exposure to realize the same effect as the effect produced by synthesizing a large number of images.

Figure 2:
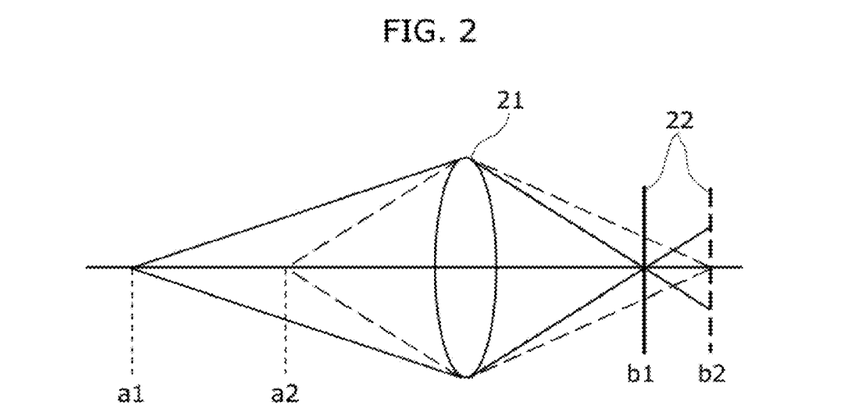
FIG. 2 is a diagram which schematically shows a state of light collection when a focal position is changed, according to the embodiment of the present invention.

FIG. 2 is a diagram which schematically shows a state of light collection when the focal position is changed. As shown in FIG. 2, it is assumed that b1 is a position of the imaging device 22 (an image plane position) focused at a subject position a1, and b2 is a position of imaging device 22 focused at a subject position a2. According to the lens formula, the position of the imaging device 22 focused at an arbitrary subject position between a1 and a2 is always located between b1 and b2. Accordingly, when the imaging device 22 moves from b1 to b2 during exposure, with respect to a1, the blur gradually becomes larger, staring from a point at which the imaging device 22 is focused at a1, and such blurs are integrated to appear overlapped in the image. On the other hand, with respect to a2, the imaging device 22 is gradually brought into focus starting from a point at which the blur is large, and such blurs still appear overlapped in the image.

This is described in further detail, using an equation. It is assumed that Expression 4 and Expression 5 below express a shape of a point spread function (hereinafter described as "PSF") which represents a state of blur in the optical system.

[Math. 3]

$$PSF(r, u, \Delta v) = \frac{2}{\pi (gb)^2} \exp\left(-\frac{2r^2}{(gb)^2}\right) \quad \text{Expression 4}$$

$$b = \frac{a}{v}|\Delta v| \quad \text{Expression 5}$$

However, f represents a focal distance of the optical system, a represents the diameter of an aperture of the optical system, u represents a subject distance, v represents an image plane position defined by a lens formula 1/f=1/u+1/v, Δv is an amount of movement of the image plane from v, R represents a distance from a blur center, and g represents a constant. Here, the image plane position is a position of the imaging device based on the lens. In other words, the image plane position corresponds to a distance between the lens and the imaging device.

Since each of Expression 4 and Expression 5 is a function of the amount of movement Δv, in the case of Δv changing from time 0 to time T in accordance with the function V(t), an ultimate PSF can be defined as Expression 6 below.

[Math. 4]

$$IPSF(r, u) = \int_0^T PSF(r, u, V(t))dt \quad \text{Expression 6}$$

Here, assuming that V(t) is uniform motion, that is, represented by V(t)=v0+st, Expression 6 can be solved as Expression 7 below.

[Math. 5]

$$IPSF(r, u) = \frac{uf}{(u-f)\sqrt{2\pi}\,rasT}\left(\text{erfc}\left(\frac{r}{\sqrt{2}\,gV(0)}\right) + \text{erfc}\left(\frac{r}{\sqrt{2}\,gV(T)}\right)\right) \quad \text{Expression 7}$$

Here, erfc(x) is a complementary error function, and b(t) is a diameter of the blur at the time t. Non-Patent Literature 1 discloses that the PSF that can be obtained from Expression 7 has an approximately constant blurred shape regardless of the distance between the distance V(0) to V(T). In other words, a starting position v+V(0) and an ending point v+V(T) of the image plane position are changed, so that a range of the subject distance can be changed in which the blur is constant.

Next, a DFD method using a reference image is described. Expression 8 below shows a relationship between a reference image R and a captured image I.

[Math. 6]

$$I(x,y)=R(x,y)*h(x,y,d(x,y)) \quad \text{Expression 8}$$

Here, h represents PSF at a position (x, y), and d(x, y) represents the subject distance at the position (x, y). In addition, * in the expression represents a convolution operation. For example, as shown in Expression 4 and Expression 5, PSF varies according to the subject distance. Accordingly, when a plurality of subjects are present at different distances, images can be obtained into each of which a convolution operation is performed with PSF that varies according to the position of each image, as the captured images.

Here, it is assumed that the PSF that corresponds to each of the subject distances d1, d2, . . . , dn is h(x, y, d1), h(x, y, d2), . . . , and h(x, y, dn). For example, when the subject in the reference image R(x, y) is located at the distance d1, the captured image I(x, y) is equal to an image in which the convolution operation is performed with H(x, y, d1) into R(x, y), and a difference occurs between the captured image I(x, y) and an image in which the convolution operation is performed with the PSF corresponding to another subject distance into R(x, y). Therefore, the subject distance d(x, y) can be calculated by sequentially comparing the difference between each of the plural images in which the convolution operation is performed with each PSF into R(x, y) and the captured image, and finding the distance corresponding to a PSF having the smallest distance. Specifically, the subject distance d(x, y) can be calculated according to Expression 9 below.

[Math. 7]

$$d(x, y) = \underset{d}{\text{argmin}}(I(x, y) - R(x, y) * h(x, y, d))^2 \quad \text{Expression 9}$$

$$(d = d_1, d_2, \ldots, d_n)$$

In practice, in order to reduce the influence of noise included in the captured image I, the image is segmented into blocks to calculate a total sum of errors within the block, followed by determining, as the distance for the all blocks, the distance at which the number of errors is smallest. This allows the distance measurement to be performed more reliably.

Figure 3:
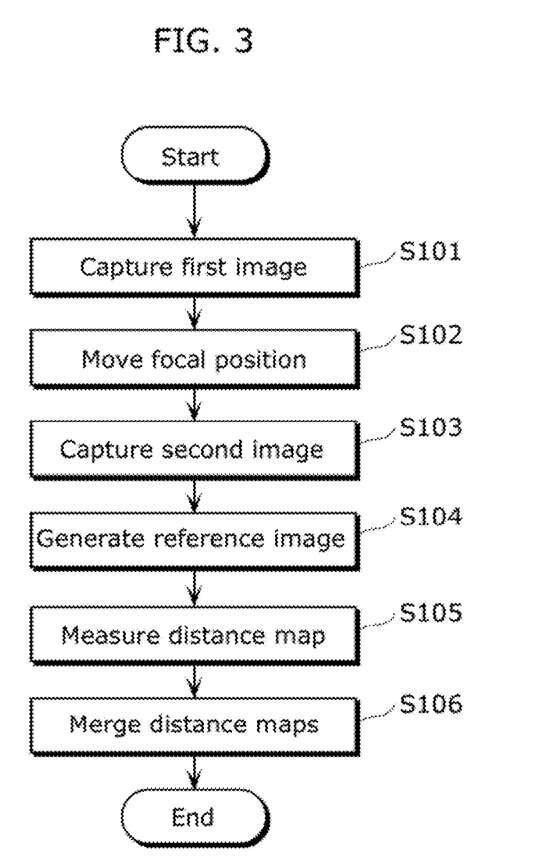
FIG. 3 is a flowchart which shows a flow of operation of the imaging apparatus according to the embodiment of the present invention.
Figure 4:
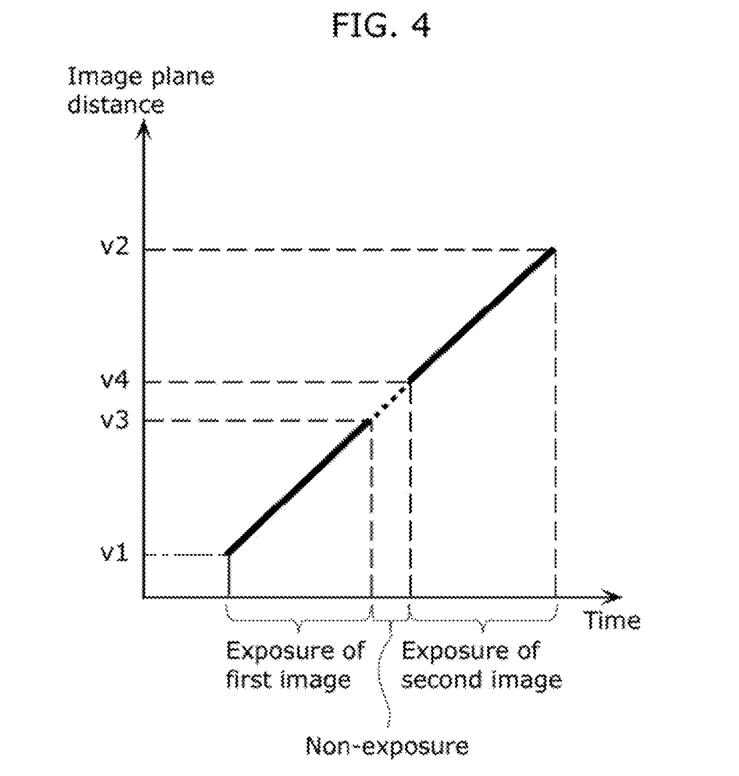
FIG. 4 is a graph which shows a changing state of the focal position, according to the embodiment of the present invention.
Figure 5:
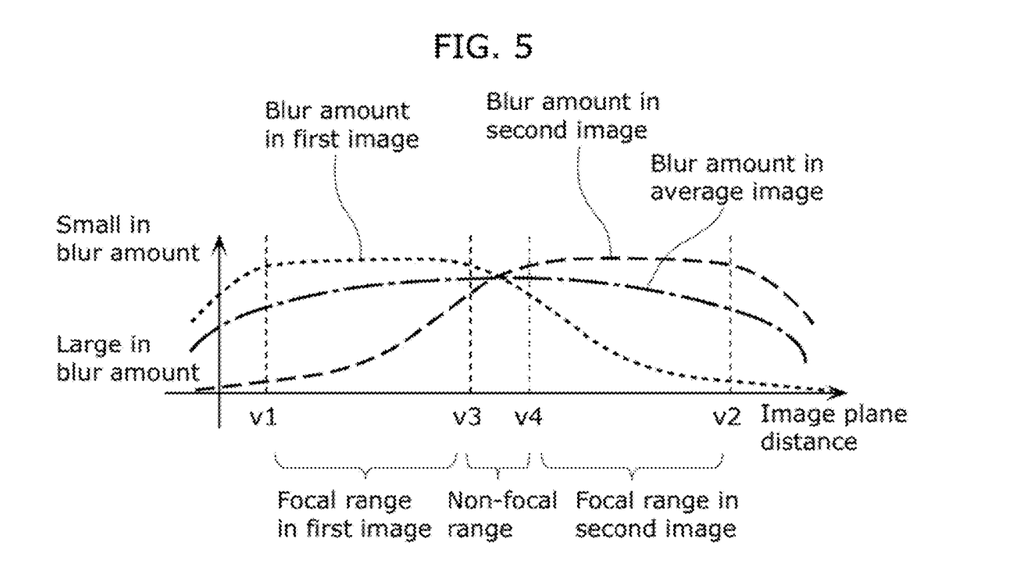
FIG. 5 is a graph which shows blur amounts in a first image and a second image, according to the embodiment of the present invention.

Next, with reference to FIGS. 3, 4, and 5, described is a flow of processing in which the distance is measured from two images having extended depths of field, using the imaging apparatus 10 according to the embodiment of the present invention. Note that the description below is given assuming that a method of changing a focal position during exposure is used as a technique to extend the depth of field.

First, the imaging unit 11 captures the first image 31a and the second image 31b which have mutually different focal ranges. Specifically, during the exposure of the first image 31a and the second image 31b, the focal range control unit 12 causes the image plane position to move at a constant speed as shown in FIG. 4. At this time, the focal range control unit 12 causes the imaging unit 11 to capture the first image 31a, causing the image plane position to move from v1 to v3 (Step S101). Next, the focal range control unit 12 causes the focal position to move by a predetermined distance (Step S102). Specifically, the focal range control unit 12 causes a capturing position to move from v3 to v4 at the constant speed during non-exposure period. After that, the focal range control unit 12 causes the imaging unit 11 to capture the second image 31b, causing the image plane position to move from v4 to v2 at the constant speed (Step S103). As shown in FIG. 5, the first image 31a thus captured has the uniform blur within the focal range of the first image 31a that corresponds to image plane positions v1 to v3, and has the blur degree according to the distance from the focal range of the first image 31a in a position out of the image plane positions v1 to v3. Similarly, the second image 31b has the uniform blur within the focal range of the second image 31b that corresponds to the image plane positions v4 to v2, and has the blur degree according to the distance from the focal range of the second image 31b in a position out of the image plane positions v4 to v2. A blur that is uniform with respect to the subject distance contributes to generation of the reference image 32, and a blur according to the subject distance contributes to the distance measurement by DFD, respectively.

Note that v3 and v4 can be set at an arbitrary position between v1 and v2, but it is preferable to set the distance between v1 and v3 and the distance between v4 and v2 are equal to each other in order to allow the first image 31a and the second image 31b to have the same exposure-time period. The first image 31a and the second image 31b have the same exposure-time period, allowing the first and second images 31a and 31b to include noise in the same level. This improves accuracy of distance calculation.

In addition, as shown in FIG. 4, the focal range control unit 12 causes the focal position to move at a constant speed during a time period which covers the exposure of the first image 31a, the non-exposure, and the exposure of the second image 31b. In other words, the focal range control unit 12 causes the image plane position to change at a constant speed during a time period from initiation to completion of the capturing of the first image 31a and the second image 31b by the imaging unit 11. This makes it possible to easily control the change of the focal position.

Note that first image 31a and the second image 31b may be different in a movement speed of the focal position during exposure.

Next, the reference image generation unit 13 generates the reference image 32 from the first image 31a and the second image 31b (Step S104). From Expression 8, the reference image 32 can be calculated by deconvolution of PSF into the captured image. Although the subject distance d(x, y) should essentially be known in order to calculate the reference image 32 accurately, PSF is constant with respect to the subject distance within the extended depth of field because the depths of field of the first image 31a and the second image 31b are extended.

Here, the reference image generation unit 13 calculates an average of the first image 31a and the second image 31b to generate an average image. As is clear from FIG. 4, the average image is an image having an approximately uniform depth of field across the entire range from v1 to v2 except for the range from v3 to v4. In other words, the average image is approximately equivalent to an image having the uniform blur across the entire range from v1 to v2. Accordingly, the reference image generation unit 13 performs a deconvolution operation into the average image by a single type of PSF corresponding to the uniform blur, thereby generating the reference image 32 focused in the entire range from v1 to v2.

If the first image 31a and the second image 31b are different in length of the exposure-time period or movement speed of the focal positions, the images can be treated, in the similar manner as above, by calculating a weighted average such that a constant weight is given to the subject distance.

In addition, a known technique such as Wiener Filter can be used for deconvolution algorithm.

Lastly, the distance measurement unit 14 calculates a distance map d(x, y) in accordance with Expression 9, from the captured first image 31a, second image 31b, and the reference image 32 which is generated in step S104 (Step S105). Specifically, the distance measurement unit 14 calculates, in accordance with Expression 9, a distance map using the first image 31a and a distance map using the second image 31b. Next, the distance measurement unit 14 calculates one distance map by merging these maps (Step S106). For the merger, it is possible to use a technique such as calculating a simple average of the distance maps calculated from the respective images.

Note that the distance measurement may be performed by Fourier transforming Expressions 8 and 9, and comparing the reference image with each of the captured images in the frequency domain. In the frequency domain, the convolution operations in Expressions 8 and 9 are transformed into multiplication, so that distance measurement can be performed at a higher speed.

As described above, the imaging unit 10 according to the embodiment can generate the reference image 32 using only the first image 31a and the second image 31b. Accordingly, the imaging device 10 can perform the distance measurement accurately with a small number of images. Since the focus change during the exposure can be realized by diverting a standard autofocus mechanism, no special mechanism is required.

Note that an example of using two images has been described above, but three or more images may be captured. In this case, an out-of-focal range is provided between each of the focal ranges of the images, and the length of each focal range is set to equal to each other, so that the images can be treated in the same manner as in the case of using two images. In this context, the reference image is calculated from an average image of all the captured images.

Although an example using the average image of the plurality of images is described in the above, the same processing as the example can be carried out using an addition image prepared by adding up a plurality of images.

In addition, in the above description, an image generated by performing the deconvolution operation on the average image by PSF is used as the reference image 32, but an image which has the approximately uniform blur in the entire range from v1 to v2 can be used as the reference image 32. For example, the aforementioned average image or the addition image may be used as the reference image 32.

[Simulation Estimation Result]

Hereinafter, an advantage of having a discontinuous focal range is described. It is assumed that a value of an appropriate distance at a position (x, y) is D, and a value of an inappropriate distance is D'. According to Expression 9, the greater the difference between the results of convolution of h(x, y, d) and h(x, y, D') into the reference image R, the easier it becomes to determine whether the distance is appropriate or not. This will be verified by simulation below.

Figure 6A:
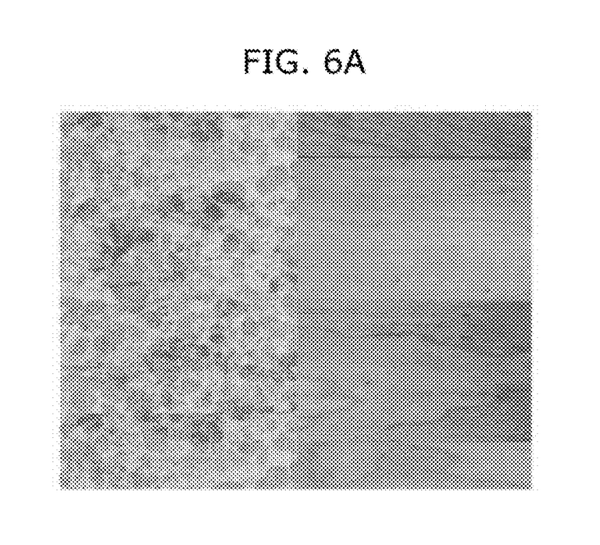
FIG. 6A is a diagram which shows a texture of a scene according to the embodiment of the present invention.
Figure 6B:
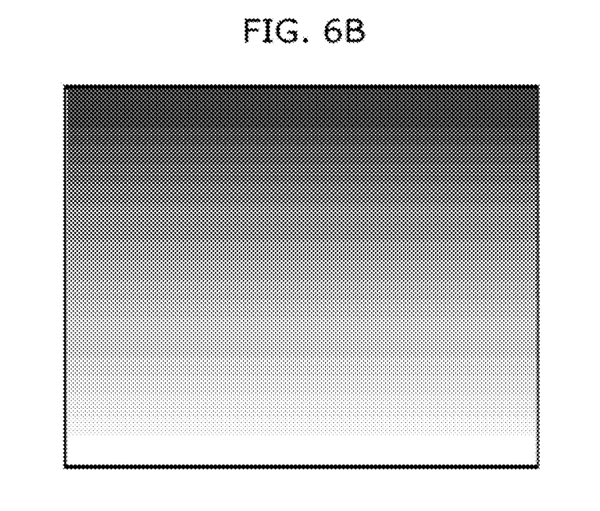
FIG. 6B is a diagram which shows a distance to a subject in the according to the embodiment of the present invention.

A scene is considered which has a texture as shown in FIG. 6A and in which the subject distance has a stepped pattern made up of 20 steps in terms of the distance up to the subject as shown in FIG. 6B. It is assumed that a darker portion in the figure indicates a farther subject distance.

A lens assumed in the simulation has performance of 9 mm focal distance and 1.4 F-number.

Next, a notation of the focal range is described. It is understood whether or not each of the 20 steps in the subject distance is in focus is represented by a 20-digit number. For example, [1, 0, 1, 1, 1, 0, 0, 0, 0, 1, 0, 0, 0, 0, 0, 0, 0, 0, 0, 0] represents that steps 1, 3, 4, 5, and 10 are in focus, starting from the farthest one.

Figure 7A:
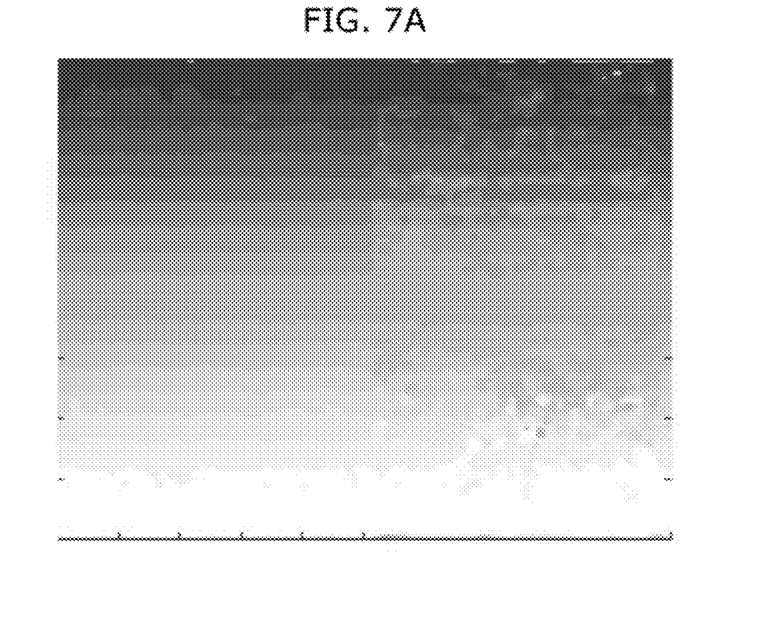
FIG. 7A is a diagram which shows a result of distance measurement performed using two images having a continuous focal range, according to the embodiment of the present invention.

First, FIG. 7A shows a result of the distance measurement by DFD from two images having continuous focal ranges (without a space). Specifically, the two images includes an image having the focal range of [1, 1, 1, 1, 1, 1, 1, 1, 1, 1, 0, 0, 0, 0, 0, 0, 0, 0, 0, 0] (first to tenth steps) and an image having the focal range of [0, 0, 0, 0, 0, 0, 0, 0, 0, 0, 1, 1, 1, 1, 1, 1, 1, 1, 1, 1] (eleventh to twentieth steps). At this time, the subject distance can be calculated according to Expression 10 and Expression 11 below.

[Math. 8]

$$d(x, y) = \underset{d}{\operatorname{argmin}}\left(\left|f^{-1}\left(\hat{F}H_1(d) - F_1\right)\right| + \left|f^{-1}\left(\hat{F}H_2(d) - F_2\right)\right|\right)$$

$$(d = d_1, d_2, \ldots, d_n)$$

Expression 10

$$\hat{F} = \frac{F_1 H_1^*(d) + F_2 H_2^*(d)}{H_1(d)H_1^*(d) + H_2(d)H_2^*(d) + \varepsilon}$$

Expression 11

However, F1 and F2 represent the frequency components of the first and second images, respectively; H1 and H2 represent frequency components of PSF corresponding to the focal ranges of the first and the second images, respectively; and H1* and H2* are complex conjugates of H1 and H2, respectively; ε represents a minor value to prevent division by zero; and $f^{-1}$ represents inverse Fourier transform.

Figure 7B:
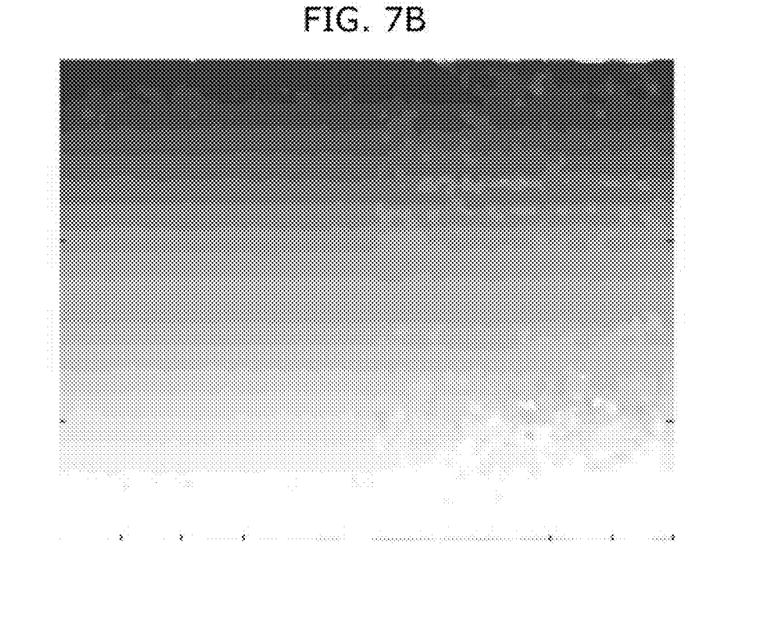
FIG. 7B is a diagram which shows a result of distance measurement performed using two images having discontinuous focal ranges, according to the embodiment of the present invention.

Meanwhile, FIG. 7B shows a result of the distance measurement from two images having a discontinuous focal range, in the same manner with the distance measurement from the two images having continuous focal ranges. Specifically, these two images are an image having the focal range of [1, 1, 1, 1, 1, 1, 1, 1, 1, 1, 0, 0, 0, 0, 0, 0, 0, 0, 0, 0] (first to tenth steps) and an image having the focal range of [0, 0, 0, 0, 0, 0, 0, 0, 0, 0, 0, 1, 1, 1, 1, 1, 1, 1, 1, 1,] (twelfth to twentieth steps). This shows that the eleventh step is the non-focal range.

Here, the closer to the texture shown in FIG. 6B the distance measurement is, the higher the accuracy is. FIG. 7A shows that the result of the measurement is different from the texture shown in FIG. 6B particularly on the right side in which a little texture appears, whereas FIG. 7B shows an improved measurement result in comparison with that shown in FIG. 7A.

Figure 8A:
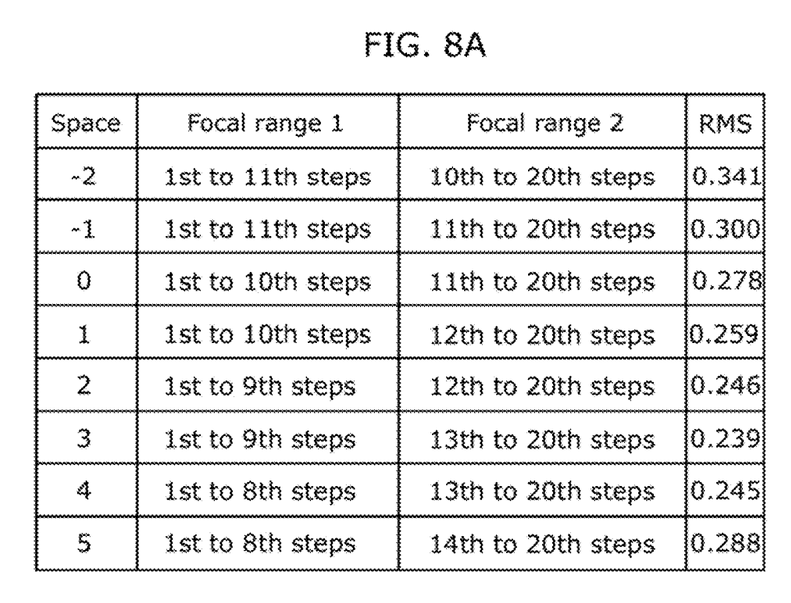
FIG. 8A is a table which shows a relationship between a space of the focal ranges and RMS of the result of the distance measurement, according to the embodiment of the present invention.
Figure 8B:
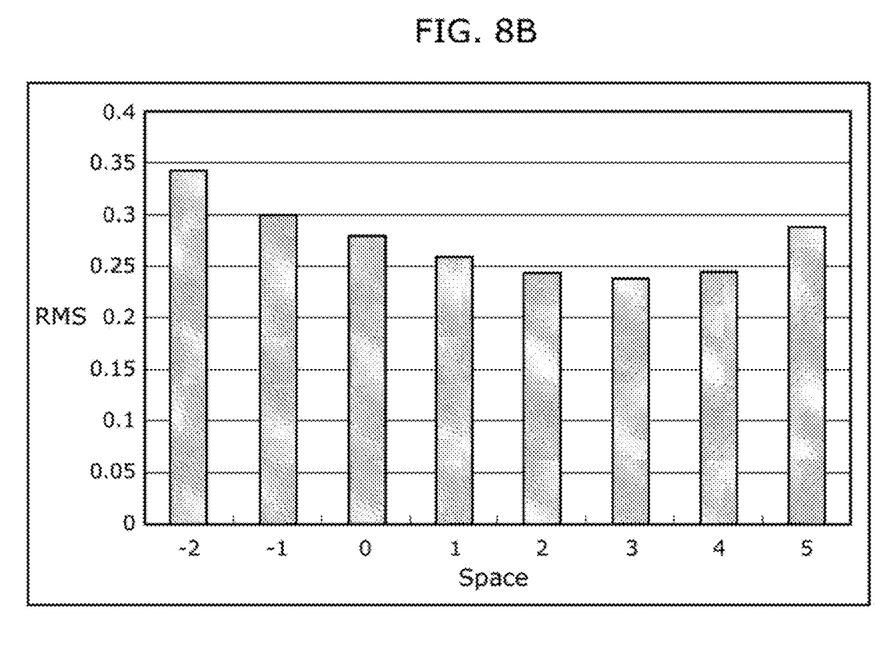
FIG. 8B is a graph which shows a relationship between the space of the focal ranges and RMS of the result of the distance measurement, according to the embodiment of the present invention.

FIGS. 8A and 8B are respectively a table and a graph, each of which shows a difference between the measurement result and appropriate data with respect to the space between the focal ranges. Root mean square (RMS) is used for the difference between the measurement result and the appropriate data. The closer to 0 a value of the RMS is, the higher the measurement accuracy is. FIG. 8A is a table which represents the RMS of the distance measurement result with respect to the space between focal ranges. FIG. 8B is a diagram which represents the RMS in a bar graph.

As shown in FIGS. 8A and 8B, a smallest combination of RMS is obtained when the out-of-focus range is set in three steps from tenth to twelfth steps. The measurement accuracy is higher in the discontinuous focal ranges than that in the continuous focal ranges. However, an extremely broad space causes the measurement accuracy to decrease. Specifically, the space is preferably provided across four steps or fewer, more preferably, in two to four steps.

Here, one step corresponds to about 50 μm in the image plane position. In other words, it is preferable that the image plane position corresponding to the space is 200 μm (corresponding to four steps) or less, more preferably, from 100 μm (corresponding to two steps) to 200 μm (corresponding to four steps).

However, since characteristics of the blur vary depending on a lens, this space is not necessarily optimal in all cases.

In the above description, the images used for DFD is captured individually. If two images are simultaneously captured, time required for the capturing can be reduced to half of that for the individual image-capturing. Hereinafter, variations of the present embodiment are described.

<Variation 1>

Figure 9A:
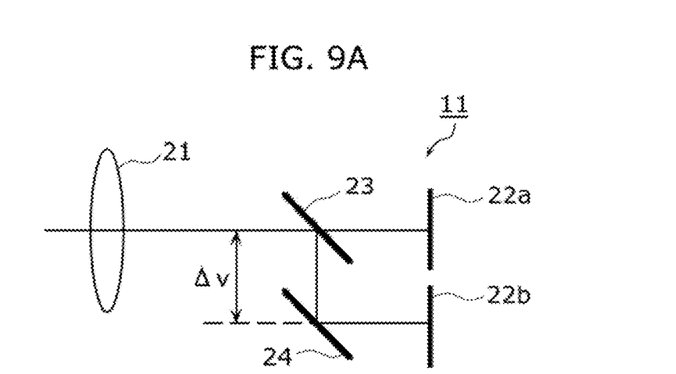
FIG. 9A is a diagram which shows a configuration of an imaging unit according to Variation 1 of the present invention.
Figure 9B:
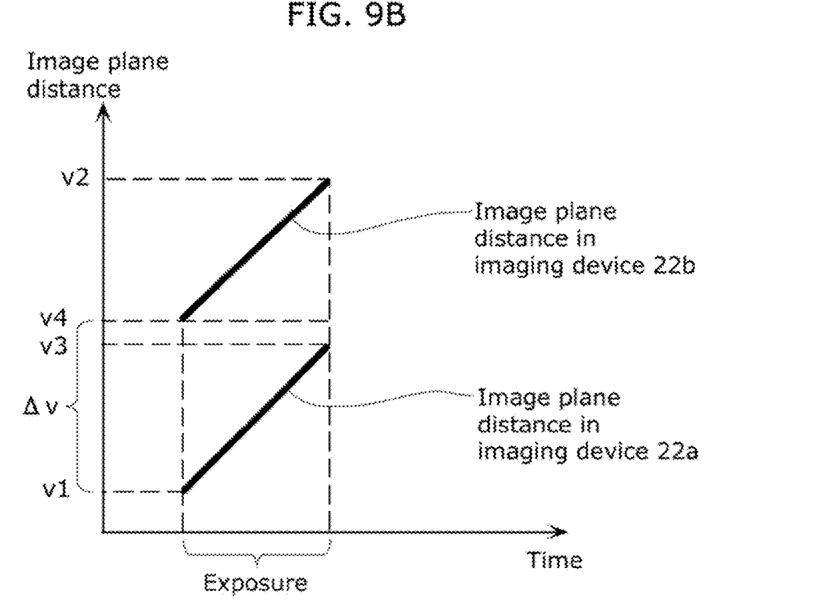
FIG. 9B is a graph which shows a changing state of a focal position according to Variation 1 of the present invention.

FIG. 9A is a diagram which shows a configuration of the imaging unit 11 according to Variation 1, while FIG. 9B is a graph which shows change in focal positions according to the Variation 1.

As shown in FIG. 9A, the imaging unit 11 includes a lens 21, two imaging devices 22a and 22b, a beam splitter 23 for splitting light, and a mirror 24 for bending an optical path the light. The two imaging devices 22a and 22b are arranged to have different optical path lengths from the lens 21. In the configuration shown in FIG. 9A, the imaging device 22b has a longer optical path than the imaging device 22a by Δv. The beam splitter 23 splits the light from the lens 21 toward the two imaging devices 22a and 22b.

The focal range control unit 12 causes the imaging device 22a and the imaging device 22b to simultaneously capture the first image 31a and the second image 31b respectively, changing the focal positions of the two imaging devices 22a and 22b simultaneously during the same time period. In such an optical system, specifically, when images are simultaneously captured using two imaging devices 22a and 22b with the focal position being changed at a constant speed during exposure, images can be obtained which have focal positions constantly displaced from each other by Δv in the imaging devices 22a and 22b, as shown in FIG. 9B. In this context, Δv is set to be equal to a distance from v1 to v4, so that two images are simultaneously captured which are not in focus in a distance from v3 to v4.

Note that as a unit to bend the optical path, a prism may be used instead of a mirror. Alternatively, as shown in FIG. 10 described later, a configuration without a mirror or prism may be employed.

<Variation 2>

Figure 10:
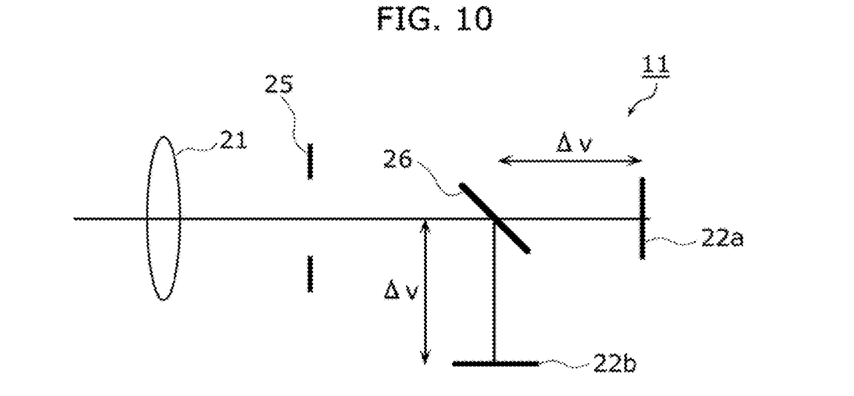
FIG. 10 is a diagram which shows a configuration of an imaging unit according to Variation 2 of the present invention.
Figure 11A:
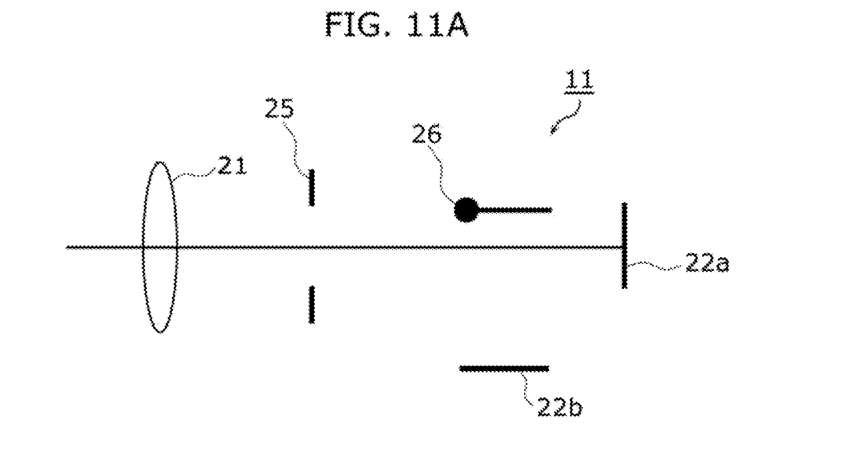
FIG. 11A is a diagram which shows an operation of the imaging unit according to variation 2 of the present invention.
Figure 11B:
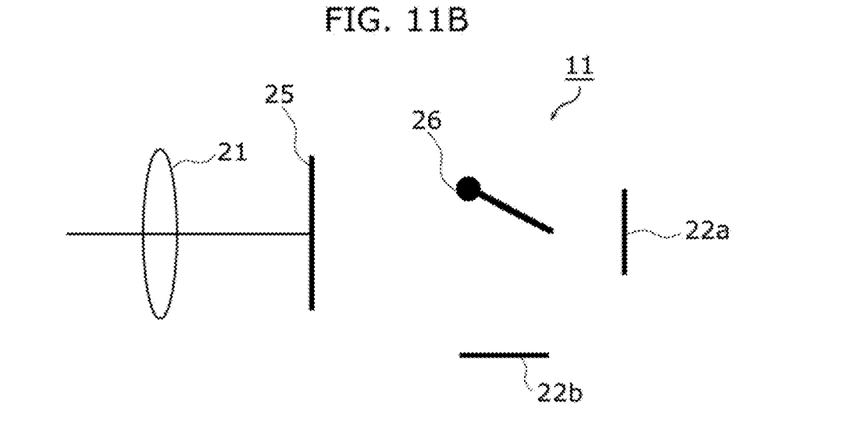
FIG. 11B is a diagram which shows the operation of the imaging unit according to Variation 2 of the present invention.
Figure 12:
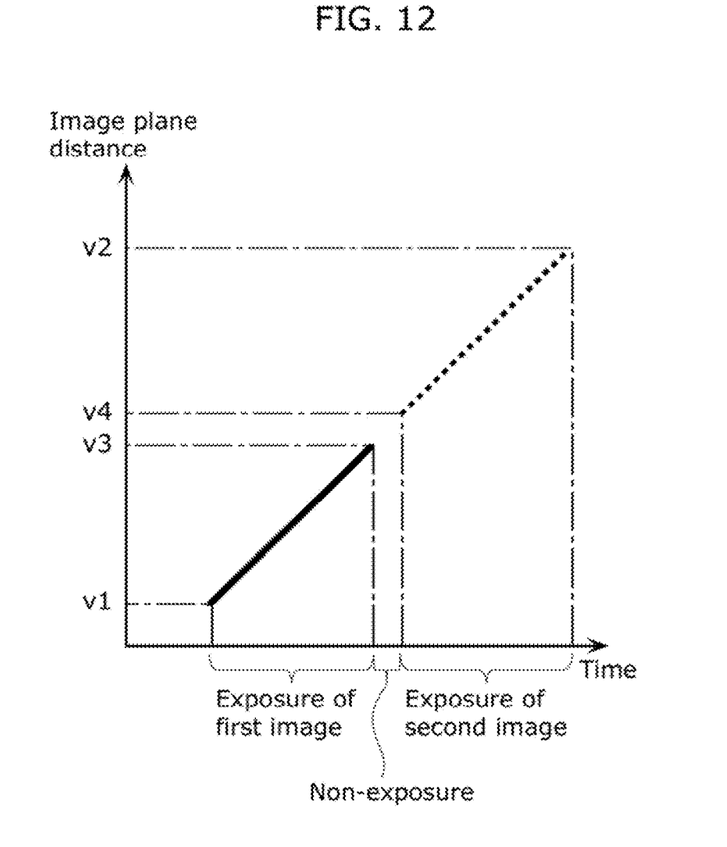
FIG. 12 is a graph which shows a changing state of a focal position according to Variation 2 of the present invention.

FIG. 10 is a diagram which shows a configuration of the imaging unit 11 according to Variation 2. FIGS. 11A and 11B are diagrams each of which shows operation of the imaging unit 11. FIG. 12 is a graph which shows a change in focal positions according to Variation 2.

The imaging unit 11 shown in FIG. 10 includes the lens 21, the two imaging devices 22a and 22b, an aperture 25, and a movable mirror 26. The movable mirror 26 is arranged in the optical path from the lens 21 to the two imaging devices 22a and 22b, and serves as an optical axis changing unit for changing an optical-axis direction of a light beam from the lens 21. In addition, the movable mirror 26 functions as a selection unit for causing the light beam from the lens 21 to selectively enter one of the two imaging devices 22a and 22b.

Furthermore, two imaging devices 22a and 22b have an equal optical-path length from the lens 21.

Figure 11C:
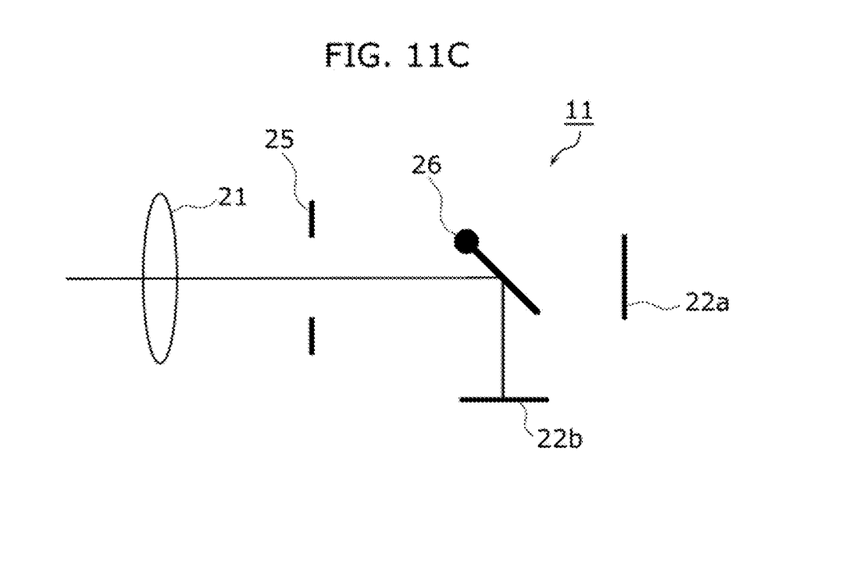
FIG. 11C is a diagram which shows the operation of the imaging unit according to Variation 2 of the present invention.

The movable mirror 26 is a galvanometer mirror or a MEMS mirror, for example. The movable mirror 26 has a function to guide the light beam to one of the two imaging devices 22a and 22b, as shown in FIGS. 11A and 11C.

The aperture 25 blocks the light beam during operation of the movable mirror 26 to switch the imaging devices one of which the light beam is to reach, as shown in FIG. 11B.

The focal range control unit 12 selects two imaging devices 22a and 22b sequentially, and causes the movable mirror 26 to allow the light beam to selectively enter the selected imaging device, thereby causing each of the two imaging devices to capture a corresponding one of the two images. Specifically, in such an optical system, the focal position is changed at a constant speed during exposure while at the same time the light beam is directed to one of the imaging devices 22a and 22b by the movable mirror 26. The light beam reaches the imaging device 22a when the focal position is in the range from v1 to v3, while the light beam reaches the imaging device 22b when the focal position is in the range from v4 to v2. Accordingly, as shown in FIG. 12, the first image 31a and the second image 31b have discontinuous focal ranges.

Here, in a configuration where the first image 31a and the second image 31b are captured using a single imaging device, a time period for reading data and the like is required before initiation of capturing of the second image 31b after completion of the capturing of the first image 31a. In contrast, in a configuration of Variation 2, such time period is not required, so that a non-exposure time period can be shortened.

Note that the optical path in Variation 2 is not limited only to the configuration shown in FIG. 10, but may employ an arbitrary optical path as long as the plural imaging devices have the same optical length.

<Other Variations>

Although the present invention is described in accordance with the aforementioned embodiments, it is needless to say that the present invention is not limited to the aforementioned embodiments. The present invention also involves the following.

(1) A part or all of components constituting the aforementioned respective devices may be formed, specifically, as a computer system including a microprocessor, a ROM, a RAM, a hard disc unit, a display unit, a keyboard, a mouse, and so on. The RAM or the hard disc unit stores a computer program. The microprocessor operates in accordance with the computer program, so that each of the devices accomplishes its function. Here, the computer program is, for accomplishing a predetermined function, configured by combining a plurality of instruction codes indicating instructions for a computer.

(2) A part or all of the components constituting each of the above devices may be formed by a single System-LSI (Large-Sale Integration) circuit. The System LSI is a super multi-function LSI manufactured by integrating a plurality of constituent units on a single chip, and is, specifically, a computer system including a microprocessor, a ROM, a RAM, and so on. The RAM stores a computer program. The microprocessor operates in accordance with the computer program, so that the System-LSI accomplishes its function.

(3) A part or all of the components constituting each of the devices may be formed as an IC card which is detachable from each of the devices or a single module. The IC card or the module is a computer system including a microprocessor, a ROM, a RAM, and so on. The IC card or the module may include the super multifunction LSI. The microprocessor operates in accordance with the computer program, so that the IC card or the module accomplishes its function. The IC card or the module may have tamper resistance.

(4) The present invention may be in the form of the method described above. In addition, the present invention may be a computer program which realizes the method by a computer, or may be digital signals including the computer program.

The present invention may also be realized by storing the computer program or the digital signal in a computer readable recording medium, such as a flexible disc, a hard disc, a CD-ROM, an MO, a DVD, a DVD-ROM, a DVD-RAM, a Blue-ray disc (BD), a semiconductor memory, and so on. Alternatively, the present invention may also include the digital signal recorded in these recording media.

The present invention may also be realized by transmission of the aforementioned computer program or digital signal via an electric telecommunication line, a wireless or wired communication line, a network represented by the Internet, a data broadcast, and so on.

The present invention may also be a computer system including a microprocessor and a memory, in which the memory stores the aforementioned computer program, and the microprocessor operates in accordance with the computer program.

Furthermore, the program or the digital signal may be stored in the recording medium so as to be transferred, or the program or the digital signal may be transferred via the network or the like so as to be executed by another independent computer system.

(5) The above embodiments and modifications may be combined arbitrarily.

All numerals used in the above represent examples for specifically describing the present invention, and the present invention is not limited to the numerals.

Furthermore, segmentation of functional blocks in the block diagram is an example, so that a plurality of functional blocks may be realized as a single functional block, a single functional block may be segmented into a plurality of blocks, or a part of function may be transferred to another functional block. Furthermore, the function of a plurality of functional blocks having functions similar to one another may be processed by a single hardware or software in parallel or in a time-division system.

A flow of execution of the above steps is an example for specifically describing the present invention, and thus, a flow other than the above may be employed. A part of the steps may be executed simultaneously (in parallel) with other steps.

All possible variations which include changes added by a person skilled in the art in his/her conceivable range may be involved in the present invention as long as the variations are not depart from the principles of the present invention.

INDUSTRIAL APPLICABILITY

The present invention is applicable to imaging apparatuses which include a lens system, particularly to a monocular imaging apparatus.

REFERENCE SIGNS LIST

10 Imaging apparatus
11 Imaging unit
12 Focal range control unit

13 Reference image generation unit
14 Distance measurement unit
21 lens
22, 22a, 22b Imaging device
23 Beam splitter
24 Mirror
25 Aperture
26 Movable mirror
31a First image
31b Second image
32 Reference image

The invention claimed is:

1. An imaging apparatus comprising:
an imaging unit configured to image a subject to generate an image;
a focal range control unit configured to cause the imaging unit to capture n images having mutually different focal ranges, changing a focal position of the imaging unit, where n is an integer greater than or equal to 2;
a reference image generation unit configured to generate, using the n imaged, a reference image to be used as a blur standard; and
a distance measurement unit configured to measure a distance to the subject based on a difference in blur degrees between the reference image and each of the n images,
wherein the focal ranges of the n images are independent of each other, and
an out-of-focus space is provided between the focal ranges.

2. The imaging apparatus according to claim 1,
wherein the imaging unit includes:
an imaging device; and
a lens which collects light into the imaging device, and
the focal range control unit is configured to change the focal position by changing a distance between the imaging device and the lens at a constant speed.

3. The imaging apparatus according to claim 2,
wherein the n images have a same exposure-time period.

4. The imaging apparatus according to claim 2,
wherein the focal range control unit is configured to change the distance between the imaging device and the lens at the constant speed during a time period from initiation to completion of the imaging of the n images by the imaging unit.

5. The imaging apparatus according to claim 1,
wherein the imaging unit includes:
a lens;
n imaging devices arranged to have mutually different optical path lengths from the lens; and
a beam splitter which splits a light beam from the lens into light beams for the respective n imaging devices, and
the focal range control unit is configured to cause the n imaging devices to simultaneously capture the respective n images, changing the focal positions of the n imaging devices simultaneously, during a same time period.

6. The imaging apparatus according to claim 1,
wherein the imaging unit includes:
a lens;
n imaging devices; and
a selection unit configured to allow a light beam from the lens to selectively enter one of the n imaging devices, and
the focal range control unit is configured to sequentially select the n imaging devices, and to cause the selection unit to allow the light beam to selectively enter the selected imaging device, thereby causing each of the n imaging devices to capture a corresponding one of the n images.

7. The imaging apparatus according to claim 1,
wherein the reference image generation unit is configured to generate an average image of the n images, and to generate the reference image using the average image.

8. The imaging apparatus according to claim 7,
wherein the reference image generation unit is configured to generate the reference image by performing, on the average image, a deconvolution operation by a single point spread function.

9. A distance measurement method performed using an imaging apparatus which includes an imaging unit configured to image a subject to generate an image, the distance measurement method comprising:
causing the imaging unit to capture n images having mutually different focal ranges, changing a focal position of the imaging unit, where n is an integer greater than or equal to 2;
generating, using the n images, a reference image to be used as a blur standard; and
measuring a distance to the subject based on a difference in blur degrees between the reference image and each of the n images,
wherein the focal ranges of the n images are independent of each other, and
an out-of-focus space is provided between the focal ranges.

10. A non-transitory computer-readable recording medium which holds a program for causing a computer to execute the distance measurement method according to claim 9.

* * * * *